C. A. C. HALL.
BRAKE MECHANISM FOR AUTOMOBILES.
APPLICATION FILED MAY 8, 1919.
1,322,432.
Patented Nov. 18, 1919.
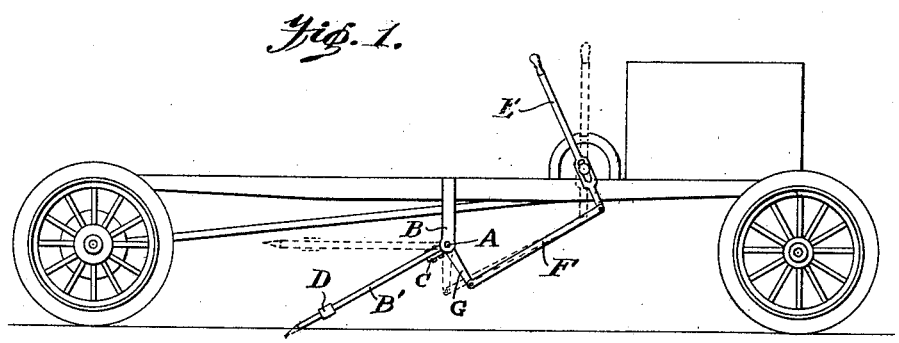
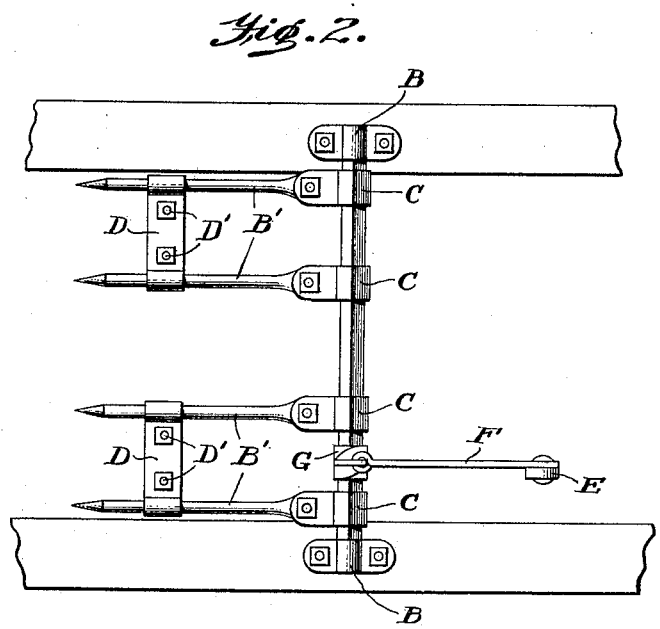
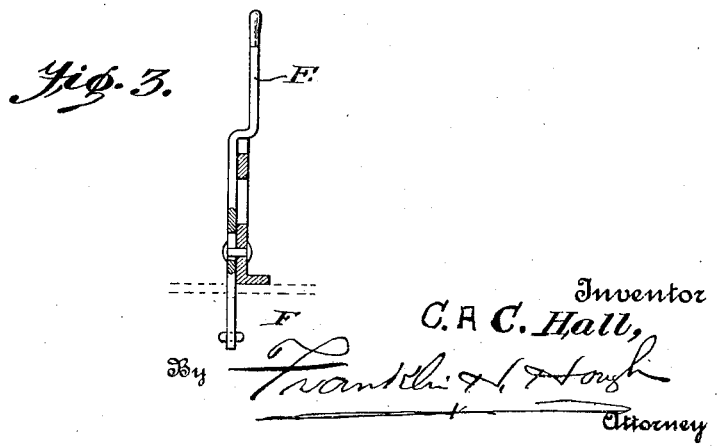
Inventor
C. A C. Hall,
By Franklin N. Hough
Attorney

UNITED STATES PATENT OFFICE.

CLEMENT A. C. HALL, OF VALENTINE, NEBRASKA.

BRAKE MECHANISM FOR AUTOMOBILES.

1,322,432.  Specification of Letters Patent.  Patented Nov. 18, 1919.

Application filed May 8, 1919. Serial No. 295,569.

*To all whom it may concern:*

Be it known that I, CLEMENT A. C. HALL, a citizen of the United States, residing at Valentine, in the county of Cherry and State of Nebraska, have invented certain new and useful Improvements in Brake Mechanism for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments to automobiles for holding the same from moving backward when going up hill, and consists essentially of a shaft with pointed rods fastened thereto, and adapted to engage the ground to hold the automobile, the shaft being actuated by suitable lever operated means.

The invention consists of a simple and efficient device of this nature, having various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which—

Figure 1 is a side elevation showing the application of my invention.

Fig. 2 is a bottom plan view, and

Fig. 3 is a view in elevation of the operating lever showing the cross pieces in transverse section.

Reference now being had to the details of the drawings by letter:

A designates a rock shaft which is mounted in suitable bearings B upon the frame of the automobile, and has a series of rods B', with angular outlined eyes C fitted over said shaft, and the ends of the bars are pointed, adapted to contact with the ground when the device is set. Straps D are passed about said rods and are held by bolts D' to securely hold the rods spaced apart, and also to prevent the teeth from going too far into the ground. An operating lever E is pivotally mounted upon the frame within convenient reach of the operator and has pivotal link connections F with an arm G fastened to the rock shaft.

By the provision of a device embodying the features of my invention, it will be noted that a simple apparatus is afforded which may be attached to the under surface of the car out of the way, and which will afford means for holding the automobile from moving backward when going up hill by merely rocking the shaft to throw the pointed rods against the ground. When not in use the apparatus may be easily swung out of the way.

What I claim to be new is:

A brake mechanism for automobiles comprising an angular outlined rock shaft, adapted to be mounted in suitable bearings upon the frame of an automobile, angular outlined eyes conforming to and fitted upon said shaft and each having a lateral extension, rods fastened to said extensions, straps having elongated eyes in the opposite ends thereof adapted to receive said rods, and bolts for holding the straps together, the latter retaining the rods in parallel relation, and lever actuated mechanism for rocking the shaft.

In testimony whereof I hereunto affix my signature in presence of two witnesses.

CLEMENT A. C. HALL.

Witnesses:
MILTON V. NICHOLSON,
HAROLD S. KUHN.